Sept. 13, 1949.                    E. F. LINDNER                    2,481,850
              MICROFILM PROJECTION VIEWER HAVING MANUAL
Filed Dec. 5, 1946      LENS ADJUSTING AND FILM MOVING MEANS
                                                        2 Sheets-Sheet 1
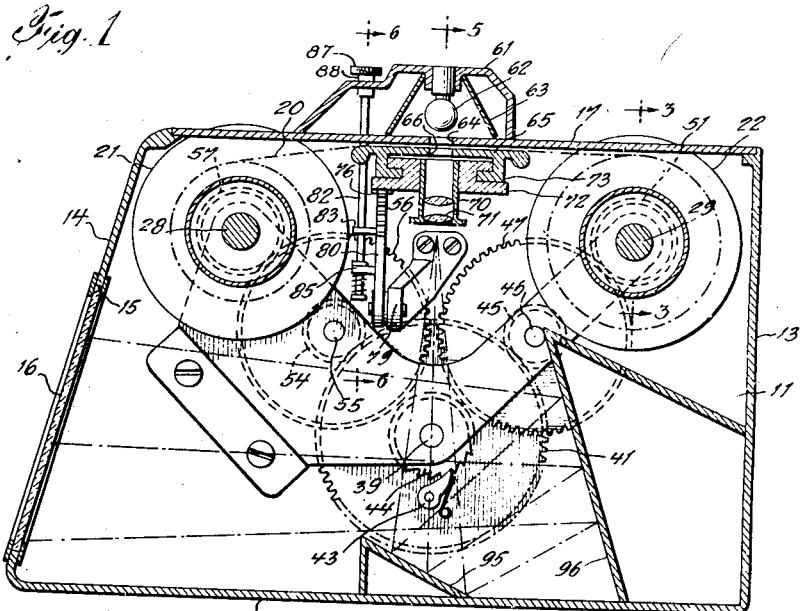
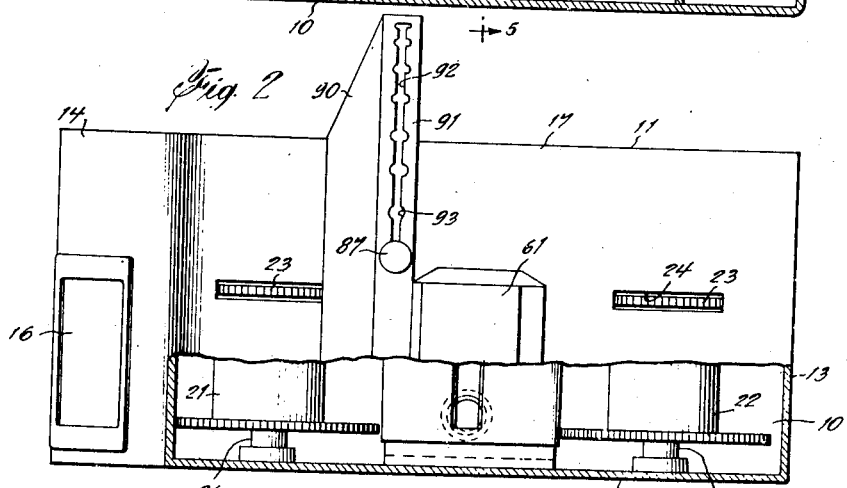
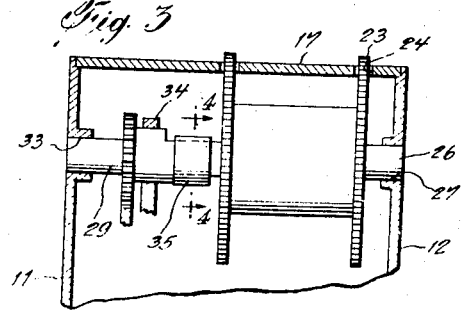
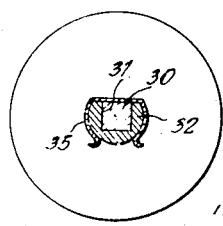
INVENTOR
Edmund F. Lindner
BY John P. Chandler
his ATTORNEY Sept. 13, 1949.　　　　　　　E. F. LINDNER　　　　　　2,481,850
　　　　　　　MICROFILM PROJECTION VIEWER HAVING MANUAL
Filed Dec. 5, 1946　　LENS ADJUSTING AND FILM MOVING MEANS
　　　　　　　　　　　　　　　　　　2 Sheets-Sheet 2
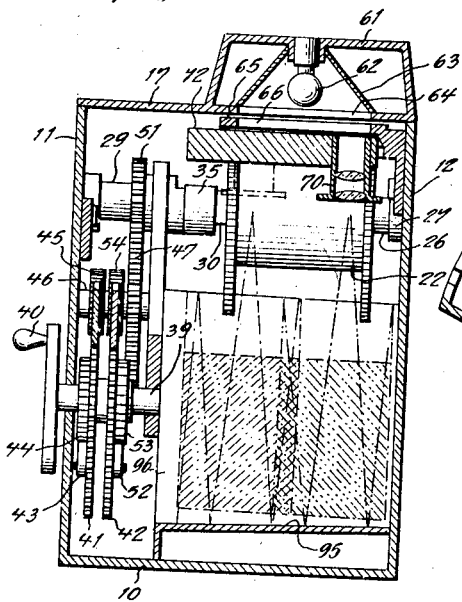
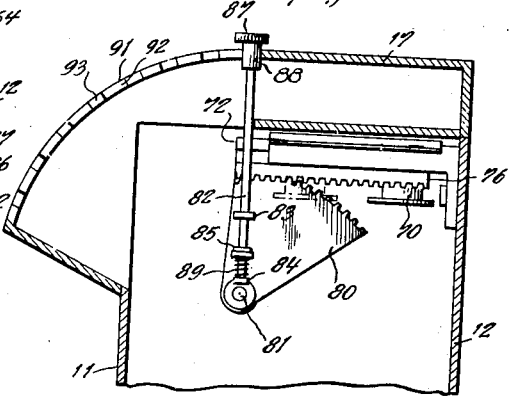
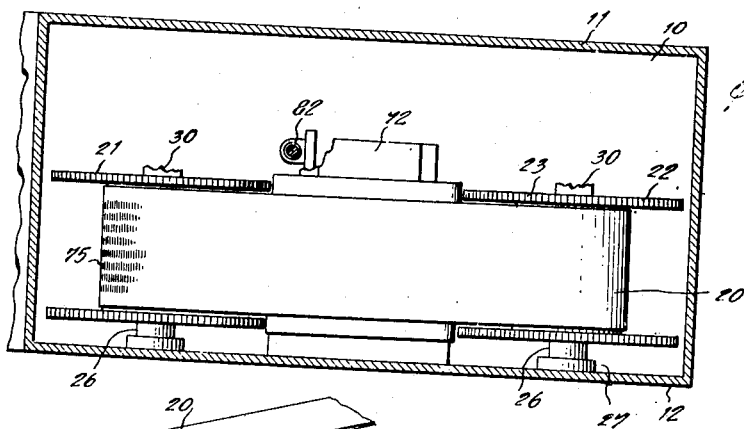
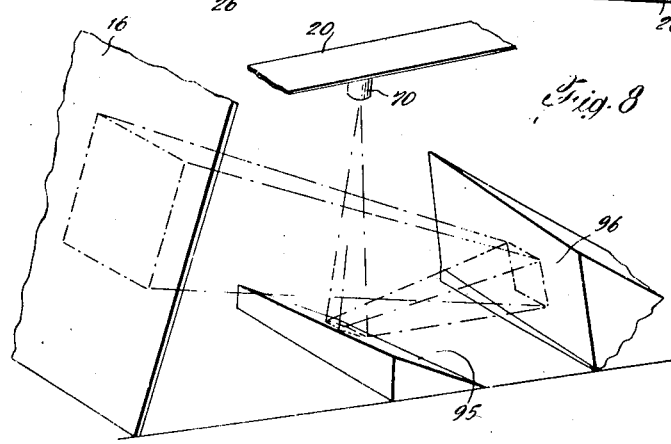
INVENTOR
Edmund F. Lindner
BY John P. Chandler
his ATTORNEY Patented Sept. 13, 1949

2,481,850

UNITED STATES PATENT OFFICE 2,481,850

MICROFILM PROJECTION VIEWER HAVING MANUAL LENS ADJUSTING AND FILM MOVING MEANS

Edmund F. Lindner, New York, N. Y.

Application December 5, 1946, Serial No. 714,243

4 Claims. (Cl. 88—24)

This invention relates to film projection apparatus, and relates more particularly to an improved microfilm projector of relatively small proportions which is designed primarily, although not exclusively, for the projection of telephone directories or other quick reference works.

An important object of the invention is to provide an improved microfilm viewer which is arranged to quickly project a selected one of a plurality of columns printed on microfilm of normal width. In the case of a telephone or other similar directory, it is desirable to arrange the material in a number of columns which have, for instance, the A's, B's and C's in the first column, the D's, E's and F's in the second, etc. This arrangement facilitates the finding of a desired listing, and the projector of the present invention is provided with means for rapidly shifting the projection lens to the desired column without requiring any lateral shifting of the film.

Another object of the invention is to provide novel transmission means for a microfilm viewer to enable the film to be rapidly moved on its supporting reels to the desired position.

A further object of the invention is to provide a microfilm viewer of small dimensions but capable of great enlargement of the data in the film, in order to permit a relatively large amount of material to be contained on a film of fairly short length. This is important in the case of reference works, since the value of microfilm in this connection is directly proportional to the speed in locating the desired data.

Yet another object of the invention is to provide means in a microfilm viewer for quickly changing the film when desired, the device being provided also with means permitting ready access to all operative parts in the interior of the housing to allow adjustment, repair, and replacement of parts.

A further object of the invention is to provide a microfilm viewer wherein the data is arranged in a plurality of columns on the film, and wherein improved means are provided for quickly adjusting the lens system to project the desired column on the viewing screen.

Yet another object of the invention is to provide a projection system which permits the successive enlarged projection of selected transversal areas of the film on a screen which is comparatively smaller in size than a screen needed for the total width of the film on the same scale of enlargement. This effect is obtained by successive movement of the lens to obtain the projection of a selected one of several transversely arranged areas, and also by a predetermined arrangement of the mirror surfaces relative to each other.

In the drawings:

Fig. 1 is a longitudinal section taken through an embodiment of the present invention.

Fig. 2 is a top plan view thereof.

Fig. 3 is a broken section taken on line 3—3 of Fig. 1.

Fig. 4 is a section taken on line 4—4 of Fig. 3.

Fig. 5 is a transverse section taken on line 5—5 of Fig. 1.

Fig. 6 is a broken section taken on line 6—6 of Fig. 1.

Fig. 7 is a horizontal section taken of the upper section of the housing.

Fig. 8 is a schematic view in perspective showing the arrangement of the projected image, the mirrors, and the viewing screen. The device of the present invention may comprise a housing having a base wall 10, opposed side walls 11 and 12, an end wall 13, and an opposite end wall 14 which is provided with an opening 15 which receives a viewing screen 16. The housing further includes a removable upper wall 17. The film, which is designated by the reference numeral 20, is arranged to be carried on reels 21 and 22. The outer peripheries of the reels are preferably knurled, as shown at 23, and project through openings 24 in upper wall 17. The reels, of course, are removable from the housing, and each reel is provided with a shaft, one terminal of which is circular, as shown at 26 in Fig. 3. This terminal is journalled in a bearing 27 in side wall 12. The opposite ends of the shafts are non-circular, as shown at 30, and are received within similarly-shaped slots 31 in drive shafts 28 and 29 which are journalled in bearings 33 in opposite side wall 11 and bearings 34 intermediate walls 11 and 12. The non-circular shaft portion 30 is retained within recess 31 by means of a spring clip 35. Thus, when it is desired to remove the reels, the removable upper wall is raised, the spring clips are removed, and the reels are lifted from their bearings.

When film is being wound on one reel or the other, such reel is driven by means which include a shaft 39 suitably journalled in the frame and which is provided exteriorly of the housing with a crank 40. Two large driving gears 41 and 42 are freely journalled on shaft 39. When this shaft is rotated in a clockwise direction, when viewed as in Fig. 1, similar rotation to first driving gear 41 is imparted by means of a pawl 43 carried by such gear 41 which engages a ratchet wheel 44 keyed to shaft 39. Thus, driving gear 41 rotates a pinion 45 carried on stub shaft 46. Also keyed to this shaft is a driving gear 47 which meshes with a pinion 51 carried on shaft 29 which supports film reel 22.

It will be seen from the foregoing that when shaft 39 is rotated in a clockwise direction, when viewed as in Fig. 1, shaft 29 and film reel 22 at the right-hand side of the device are similarly rotated in the clockwise direction, thus winding the film 20 on such film reel. When shaft 39 is oppositely rotated, however, no rotation is imparted to first gear 41 carried thereon since pawl 43 merely rides over the teeth in ratchet wheel 44. In this instance, however, a second and oppositely-facing pawl 52 carried on second driving gear 42 engages a ratchet wheel 53 keyed to shaft 39. Thus, counter-clockwise rotation is imparted to second driving gear 42, which, in turn, meshes with a pinion 54 carried on stub shaft 55. Also keyed to this shaft is a gear 56 which meshes with a pinion 57 carried on shaft 28. Thus, counter-clockwise rotation is imparted to shaft 28 and film reel 21, and the film is accordingly wound on such reel.

A light housing 61 is mounted on removable cover 17. Within this light housing a light source 62 is mounted, and a reflector 63 is arranged in spaced relation to the light source. The beam of light is directed through a narrow transverse opening 64 in such upper wall 17, whereupon it strikes the film 20 as the same passes over a platen 65 which is fitted with a light opening 66 which registers with opening 64. A lens tube 70 which supports lenses 71 is carried on a slide 72 mounted for transverse movement on trackways 73 associated with platen 65. It was earlier pointed out that the indicia on the film is printed in a plurality of longitudinally-arranged columns, as shown at 75 in Fig. 7. The beam from the source of light strikes the film over its entire width, although only that portion of the indicia is projected which is adjacent the lens tube in any selected one of the several transverse positions.

The means for moving the lens tube and its supporting slide 72 are as follows. A rack 76 is associated with the lower surface of slide 72. This rack is arranged to be engaged by a segmental gear 80 carried on a shaft 81 which is pivotally mounted on a bracket 79. The gear is moved through an arc by means of a rod 82 which passes through spaced supports 83 and 85 carried on gear 80 and providing a mounting for the rod to permit longitudinal movement thereof. The rod is urged downwardly, when viewed as in Fig. 6, by means of a coil spring 89 carried adjacent the lower end of such rod. The lower end of the coil spring engages a stop 84, and the upper end engages support 85 carried on the gear 80. At its upper end, rod 82 carries a finger piece 87 which is removable from the rod when cover 17 is to be raised. Upper wall 17 is formed with a sidewise extension 90 having an arcuate upper surface 91 which is provided with a narrow slot 92 through which rod 82 may travel during its arcuate movement. At spaced intervals such slot 92 is provided with enlarged, generally circular portions 93.

It will thus be seen that to move slide 72 which carries lens tube 70 to any selected transverse position, finger piece 87 carried on rod 82 is raised, thus disengaging cylindrical portion 88 below the finger piece from one of the circular openings 93 in arcuate portion 91. This frees rod 82 for arcuate movement, and as the same is moved, gear segment 80 moves rack 76 and accordingly slide 72. At the lower end of the casing the image is projected on a mirror 95, which, in turn, reflects the image to a second mirror 96, and from thence the image is projected upon screen 16. In most instances these mirrors will be plane mirrors, although in some instances one or both of the mirrors may be otherwise formed. The number of mirrors employed may vary, depending upon a number of factors.

While one form or embodiment of the invention has been shown and described herein for illustrative purposes, and the construction and arrangement incidental to a specific application thereof have been disclosed and discussed in detail, it is to be understood that the invention is limited neither to the mere details or relative arrangement of parts, nor to its specific embodiment shown herein, but that extensive deviations from the illustrated form or embodiment of the invention may be made without departing from the principles thereof.

What I claim is:

1. A projector for micro-film which has indicia printed thereon, said projector comprising a pair of reels upon which the film is carried and is adapted to be wound and unwound, a light source arranged to project a beam of light through the film, a viewing screen, a mirror arranged to reflect the image from the film to the screen, and a lens system arranged to move transversely of the film to project indicia in a selected area of the film upon the screen, a trackway disposed transversely of the film, a slide carrying the lens system and mounted for travel on said trackway, a segmental toothed rack carried by said slide, a segmental gear mounted for pivotal movement and engaging the teeth of said rack, a manually movable lever carried by the gear, and releasable means for securing the lever in an adjusted fixed position.

2. A projector for micro-film which has indicia printed thereon in a plurality of columns, said projector comprising a housing, a pair of reels journalled within the housing and upon which the film is carried and is adapted to be wound and unwound, a light source arranged to project a beam of light through the film, a translucent viewing screen, a mirror arranged to reflect the image from the film to the screen, and a projection lens arranged to move transversely of the film to project indicia in a selected column upon the screen, supporting means for the lens including a slide, a trackway for the slide, a toothed rack carried by the slide, a segmental gear engaging the rack teeth, a manually movable lever carried by the gear provided with an extensible sleeve associated with the lever, and an arcuate plate having a slot with spaced, enlarged portions for receiving the sleeve to secure the lever in an adjusted fixed position.

3. A projector for micro-film which has indicia printed thereon in a plurality of columns, said projector comprising a pair of reels upon which the film is carried and is adapted to be wound and unwound, a platen having a light opening over which the film travels, a light source arranged to project a beam of light through the film, a viewing screen, a mirror arranged to reflect the image from the film to the screen, and a projection lens arranged to move transversely of the film to project indicia in a selected column upon the screen, a slide carrying such lens, a trackway supporting the slide, a rack carried by the slide, a pivoted segmental gear whose teeth engage the rack, a lever carried by the gear which is arranged for manual rotation, an arcuate plate having a slot in which the lever travels, and means for securing the lever in an adjusted, fixed position relative to such slot.

4. A projector for micro-film which has indicia printed thereon in a plurality of columns, said projector comprising a housing, a pair of reels journalled within the housing and upon which the film is carried and is adapted to be wound and unwound, a drive shaft provided with gear trains for rotating such reels, ratchet means associated with the gear trains for driving one of the reels when the drive shaft is rotated in one direction and for driving the other reel when it is rotated in the opposite direction, a light source arranged to project a beam of light through the film, a translucent viewing screen associated with one of the walls of the housing, a plurality of mirrors arranged to reflect the image from the film to the screen, a projection lens arranged to move transversely of the film to project indicia in a selected column upon the screen, and manually-actuable means controlling movement of the lens comprising a support for the lens, a toothed rack carried by the support, a pivoted gear whose teeth engage the rack teeth, a lever carried by the gear and provided with a sliding sleeve, an arcuate plate having a plurality of spaced openings for receiving the sleeve and a slot connecting the openings, whereby the sleeve can be moved from opening to opening to an adjusted, fixed position.

EDMUND F. LINDNER.

REFERENCES CITED

The following references are of record in the file of this patent:

UNITED STATES PATENTS

| Number | Name | Date |
| --- | --- | --- |
| 1,889,575 | Sebille | Nov. 29, 1932 |
| 1,918,468 | Harding | July 18, 1933 |
| 2,008,982 | Hopkins | July 23, 1935 |
| 2,037,705 | Chapman | Apr. 21, 1936 |
| 2,125,582 | Pratt et al. | Aug. 2, 1938 |